US006912828B1

(12) United States Patent
Yamay

(10) Patent No.: US 6,912,828 B1
(45) Date of Patent: Jul. 5, 2005

(54) PACKAGING METHOD AND APPARATUS

(75) Inventor: Yehuda Yamay, Byniamina (IL)

(73) Assignee: Hefestus Ltd., Byniamina (IL)

( * ) Notice: Subject to any disclaimer, the term of this patent is extended or adjusted under 35 U.S.C. 154(b) by 0 days.

(21) Appl. No.: 09/914,227

(22) PCT Filed: Feb. 23, 2000

(86) PCT No.: PCT/IL00/00114

§ 371 (c)(1),
(2), (4) Date: Dec. 19, 2001

(87) PCT Pub. No.: WO00/50305

PCT Pub. Date: Aug. 31, 2000

(30) Foreign Application Priority Data

Feb. 24, 1999 (IL) .................................. 128710
Nov. 2, 1999 (IL) .................................. 132708

(51) Int. Cl.[7] ............................................. B65B 31/04
(52) U.S. Cl. ........................ 53/432; 53/477; 53/510; 53/300
(58) Field of Search ................. 53/432, 467, 476, 53/477, 510, 511, 300, 309, 310, 403

(56) References Cited

U.S. PATENT DOCUMENTS

| 3,283,469 | A | * | 11/1966 | McBrady et al. | 53/432 |
| 4,201,030 | A | * | 5/1980 | Mahaffy et al. | 53/432 |
| 4,223,513 | A | * | 9/1980 | Mahaffy et al. | 53/432 |
| 4,472,924 | A | * | 9/1984 | Vogele et al. | 53/511 |
| 4,624,099 | A | * | 11/1986 | Harder | 53/432 |
| 4,982,555 | A | * | 1/1991 | Ingemann | 53/432 |
| 5,071,667 | A | * | 12/1991 | Grune et al. | 53/432 |
| 5,155,974 | A | * | 10/1992 | Garwood | 53/432 |
| 5,271,207 | A | * | 12/1993 | Epstein et al. | 53/432 |
| 5,509,252 | A | * | 4/1996 | Gorlich | 53/432 |
| 5,555,705 | A | * | 9/1996 | Balcombe | 53/432 |
| 5,718,101 | A | * | 2/1998 | Noel et al. | 53/432 |
| 5,749,203 | A | * | 5/1998 | McGowan, Jr. | 53/432 |

FOREIGN PATENT DOCUMENTS

| EP | 0 214 372 | 3/1987 |
| EP | 0352382 | 1/1990 |
| EP | 0469296 | 2/1992 |
| FR | 2597833 | 10/1987 |
| WO | 9103400 | 3/1991 |
| WO | 9416949 | 8/1994 |
| WO | 9624470 | 8/1996 |

* cited by examiner

Primary Examiner—Louis Huynh
(74) Attorney, Agent, or Firm—Birch, Stewart, Kolasch & Birch, LLP

(57) ABSTRACT

A method for packaging a product in a hermetically sealed container having a cup-shaped rigid or semi-rigid body with a rim fitted with a closure, the method comprising introducing the product into the cup-like shaped body. Forming an isolated space with a gas inlet and a gas outlet, the space defined between the body and a closure-forming member adjacent to and with a clearance from the rim. Introducing a replacement gas through the inlet to replace at least a substantial portion of gas originally contained in the isolated space, and displacing at least one of the body or the closure-forming member towards the other of the two members to close the clearance and to attach the closure-forming member to the rim, and hermetically attaching the two to one another to form a gas-tight steel.

8 Claims, 11 Drawing Sheets

PACKAGING METHOD AND APPARATUS

This application is the national phase under 35 U.S.C. §371 of PCT International Application No. PCT/IL00/00114 which has an International filing date of Feb. 23, 2000, which designated the United States of America and was published in English.

FIELD OF THE INVENTION

The present invention concerns generally to a method and apparatus for packaging a product in a hennetically sealed container. The method and apparatus of the invention are particularly applicable to the packaging of food products, medical supplies or devices, although not limited to these applications.

BACKGROUND OF THE INVENTION

Very often a product contained within a container does not fill the entire container's space with the remaining space (to be referred to herein as the "residual space") containing a gas. Often, the gas's composition plays a role in the product's shelf life. This is the case, for example, in containers holding food products. Air, which contains about 21% oxygen, facilitates growth and development of microorganisms that degrade the food product. There are many apparatuses and method which have been proposed and developed aimed at replacing the air in the residual space with another gas having a desired composition. For example, in the case of food products such a replacement gas is typically nitrogen or carbon dioxide.

In the context of this writing the gas which is introduced into the container to fill the residual space will be referred to herein as the "replacement gas". As will no doubt be appreciated, the nature of the replacement gas depends on the type of product and the type of desired effect. In the case of food products, a replacement gas will be a gas which has a composition such that it does not permit growth and development of microorganisms, particularly a gas essentially devoid of oxygen. In the case of other kinds of products the replacement gas may have a variety of different gas composition, for example: consisting of a chemically inert, e.g. a noble gas; consisting of a gas with a certain surface activity to treat or prepare the product; may be a disinfecting gas intending to destroy microorganisms which may be contained in or on the product; etc.

GENERAL DESCRIPTION OF THE INVENTION

The present invention is directed to a method and system for packaging a product within a container such that the residual space is substantially filled with a replacement gas. The type of container to which the invention pertains is such made from a rigid or semi-rigid body having side walls with rims defining a product-introducing opening. The container body may have a base with side walls extending therefrom; it may be conical; it may be hemispheric. Such a body of a container will be referred to herein as "cup-like shaped body". The cup-like shaped body may have a generally rectangular base, a circular or oval base, may be elongated or flat (having a dish-like shape), may be a container formed with a partition for separate storage of two different components in two individually sealed compartments, e.g. granola in one compartment and yogurt in the other; and a variety of different shapes. It may readily be appreciated that the invention is not limited to containers of a different shape and any container having a cup-like shaped body, as defined herein, may be filled by the use of the apparatus and method of the invention.

The term "rigid" or "semi-rigid" refers to the ability of the container self-sustaining its shape. An example of a container body with these properties is such made of tin, or preferably a container body made of a rigid plastic material of the kind typically used for a variety of food products such as dairy products. A rigid or semi-rigid body may also be a body made of a flexible material reinforced by ribs, by fold lines formed by welding, or by a variety of other reinforcing means known per se, imparting a shape-retaining property onto said body.

The present invention provides, by a first of its aspects, a method for packaging a product in a hennetically sealed container having a cup-shaped rigid or semi-rigid body with a rim fitted with a closure, the method comprising:
  (a) introducing the product into said cup-like shaped body;
  (b) forming an isolated space with a gas inlet and a gas outlet, the space defined between said body and a closure-forming member adjacent to and with a clearance from said rim;
  (c) introducing a replacement gas through said inlet to replace at least a substantial portion of gas originally contained in said isolated space: and
  (d) displacing at least one of said body or said closure-forming member towards the other of the two members to close said clearance and to attach the closure-forming member to said rim, and hermetically attaching the two to one another to form a gas-tight steel.

As will be appreciated, steps (a) and (b) may be performed one after the other in the given order; may be in their reversed order, namely first forming the isolated space and then introducing the product is introduced into the container within such space: or the two steps may be carried out simultaneously.

By its second aspect, the present invention provides an apparatus for forming a hermetically sealed product-containing container, the container having an essentially cup-like shaped body with rims fitted with a closure: the product not filling the entire container leaving residual space therein; the apparatus comprising:
  a holder for holding said container body;
  a spacer member sealingly engageable with said holder and with a closure-forming member, and having an opening; in a state of seal engagement of said spacer member with said holder and said closure-forming member, said opening, said container body and said closure-forming member, define together the isolated space:
  a gas inlet and a gas outlet for introducing a replacement gas into said isolated space, and exhausting gas therefrom, respectively; and
  a sealing mechanism comprising a displacing arrangement for displacing one or both of said container body and said closure-forming member towards one another and attaching them to one another in a gas-tight fashion.

The closure of the container may in principle be any closure which can be made to form a hennetically sealed attachment with the container body. In the case of a container body made of a plastic material, the closure-forming member is preferably heat weldable, for heat welding to the body's rim. Such a film is preferably a laminate as generally known in the art, for example a laminate of two plastic films, a laminate of a plastic film and aluminum foil, a laminate consisting of more than two layers, and many others, all as known per se. It should however be appreciated that although a closure-forming member made of a film is but one embodiment and other embodiments, such as a closure forming member made from a rigid or semi-rigid plastic material may also be employed.

Where said closure-forming member is a film, in order to close said clearance, at least a portion of the film will typically be pushed towards the rim of the container's body and then heat welded thereto, followed by trimming the film around the rim.

In accordance with one, currently preferred, embodiment of the invention, the gas outlet is connected to the external atmosphere. In accordance with another embodiment, the gas outlet is connected to a vacuum source. Where a vacuum source is employed, typically but not exclusively, the vacuum is first applied, gas is drained from within said isolated space, and only after a period of time allowing for gas drainage, the replacement gas is introduced.

In accordance with the above preferred embodiment, said holder is a planar member formed with an opening for receiving and engaging the container body. The holder is typically provided with a skirt surrounding the opening for holding and engaging the rims of said container body.

The gas outlet may be formed by bores in said holders, preferably bores leading from a portion adjacent said opening therein to the outside atmosphere. Alternatively, the gas outlet may also be constituted by bores within said spacer member.

Tile gas inlet is typically formed within said spacer member. The gas inlet preferably comprising a plurality of nozzles. Where the gas outlet is formed in said spacer member, such nozzles will usually be formed in portions of the spacer member other than portions hosting the gas outlet bores. The nozzles will usually be directed into the isolated space so as to ensure sufficient turbulence for effective flushing of the residual space with the replacement gas.

BRIEF DESCRIPTION OF THE DRAWINGS

In order to understand the invention and to see how it may be carried out in practice, preferred embodiments will now be described, by way of non-limiting example only, with reference to the accompanying drawings, in which:

FIGS. 3A–4A shows the apparatus of FIG. 1 in several operational steps, where FIGS. 3A–3E are partially cut, isometric views, and FIGS. 4A–4F are partial and cross-sectional longitudinal views of the apparatus in corresponding operational steps.

DETAILED DESCRIPTION OF A PREFERRED EMBODIMENT

Figure 1:
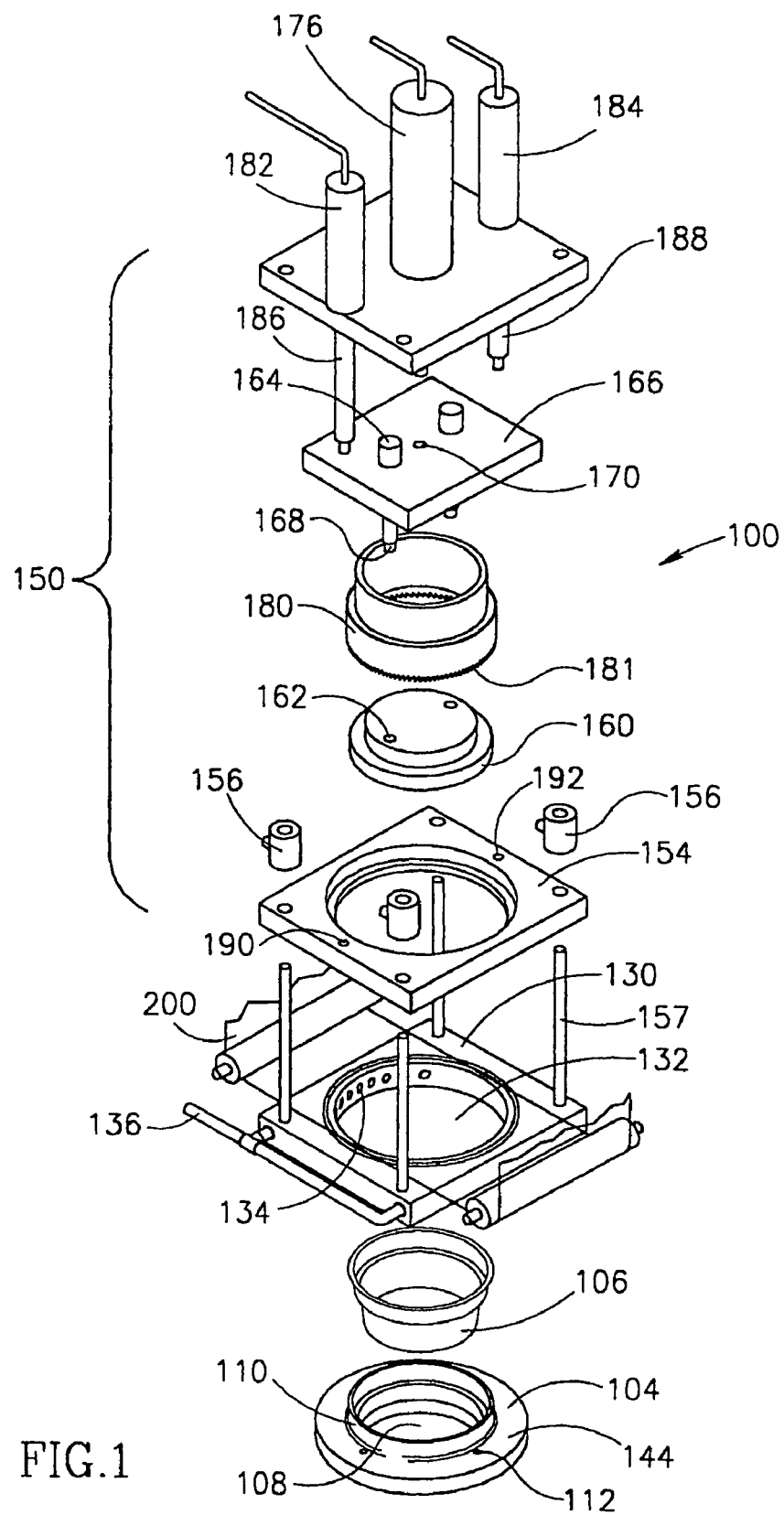
FIG. 1 is an exploded view of an apparatus in accordance with a preferred embodiment of the invention.
Figure 2:
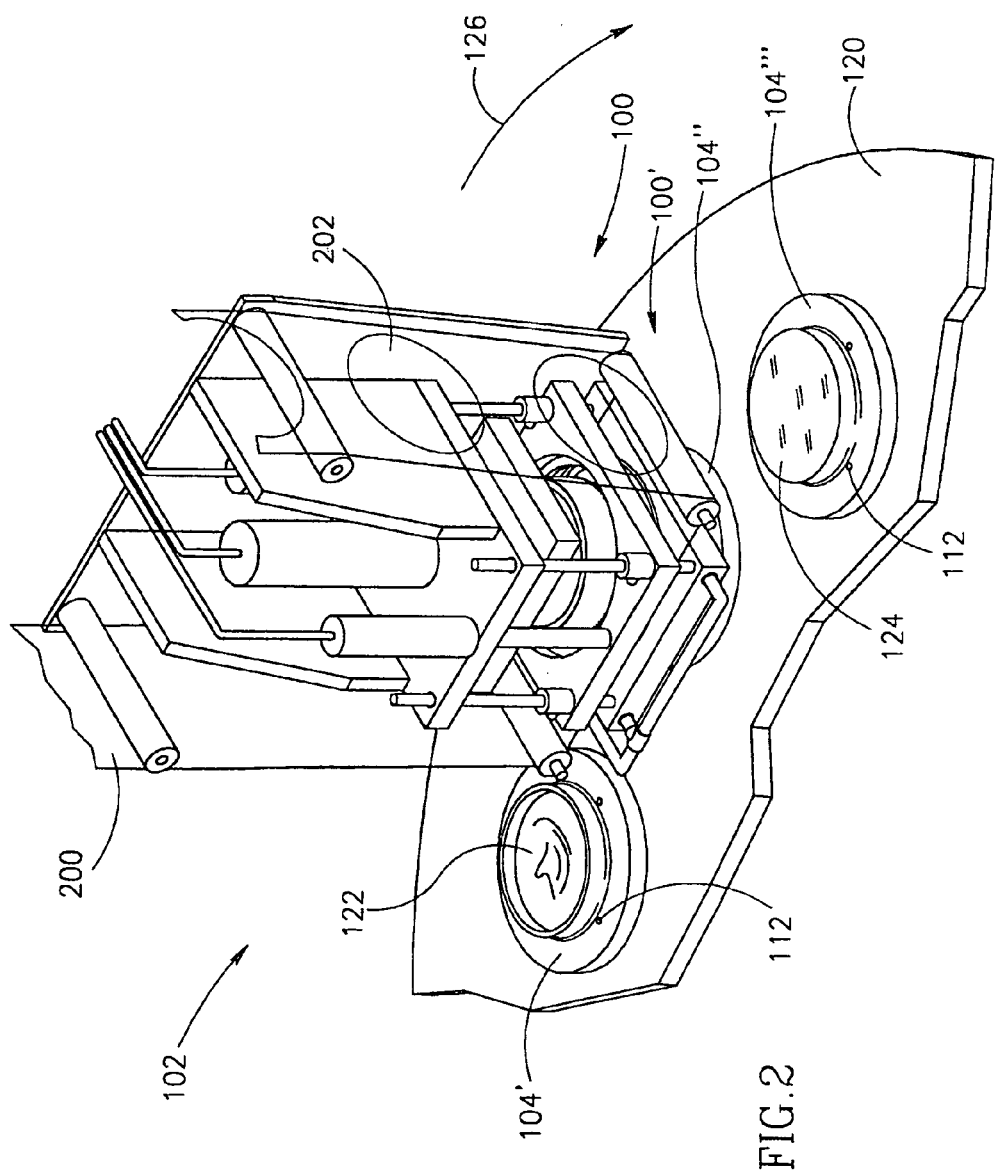
FIG. 2 is an isometric view of the apparatus of FIG. 1.

Reference is first being made to FIGS. 1 and 2 showing an apparatus in accordance, with an embodiment of the invention. FIG. 1 shows the apparatus generally designated 100, in an exploded view. FIG. 2 shows an apparatus as a workstation in a packing line generally designated 102. The apparatus 100 comprises, as can best be seen in FIG. 1, a holder 104 for holding a rigid or semi-rigid cup-shape container body 106, received within opening 108 fitted with an upright skirt 110. Holder 104 is held in accordance with one embodiment of the invention, on a revolving feeding carousel 120 seen in FIG. 2.

Three holders are seen in FIG. 2, the first designated 104', accommodating a container filled with a pasty substance 122 prior to its introduction to apparatus 100; the second holder designated 104" being situated and forming a function as a part of a workstation 100'; the third holder designated 104'" accommodating a sealed container exiting from workstation 100' and sealed with a closure 124. It is thus apparent that carousel 120 rotates in the direction of arrow 126.

As will be appreciated, although the invention will be described herein with particular reference to the application for packaging a pasty-food product, particularly a dairy product, it is clear that the invention is not limited thereto and it applies, mutatis mutandis, to packaging of a variety of other food products, as also defined above.

Holder 104 is formed with gas outlet bores 112.

Apparatus 100 further comprises a spacer member 130 formed with a central opening 132, there being a plurality of gas inlet nozzles 134 pointing towards the opening's interior. Gas nozzles 134 are in flow communication with replacement gas inlet pipe 136, connected to a source of replacement gas (not shown). In the case of a food product, the replacement gas is typically nitrogen or carbon dioxide.

The apparatus further comprises a sealing and trimming mechanism 150 comprising a film pressing plate 154; displacement limiting members 156 fitted over axial rods 157, limiting upwards displacement of plate 154; a film displacement and heat welding plate 160 having two bores 162 engaged with the end 168 of a spring biased piston rod of a piston 164 held by plate 166. Plate 166 is engaged at its bore 170 to the end of a piston rod of pneumatic or hydraulic piston 176 and is axially displaceable thereby. The apparatus further has a trimming member 180.

Two pneumatic or hydraulic pistons member 182 and 184 with piston rods 186 and 188, respectively are provided, and are connected, through respective bores 190 and 192 to pressing plate 154.

As can best be seen in FIG. 2, the apparatus is fed with a continuous film 200 constituting a closure-forming member, which extends between spacer member 130 and film pressing plate 154. In a manner to be described further below, the used film exiting the apparatus and fed to a pickup spool (not shown) has cutouts 202 resulting from cutting out a portion used for closure of the container.

The operation of the apparatus will now be described with reference to FIGS. 3A–4F.

Figure 3A:
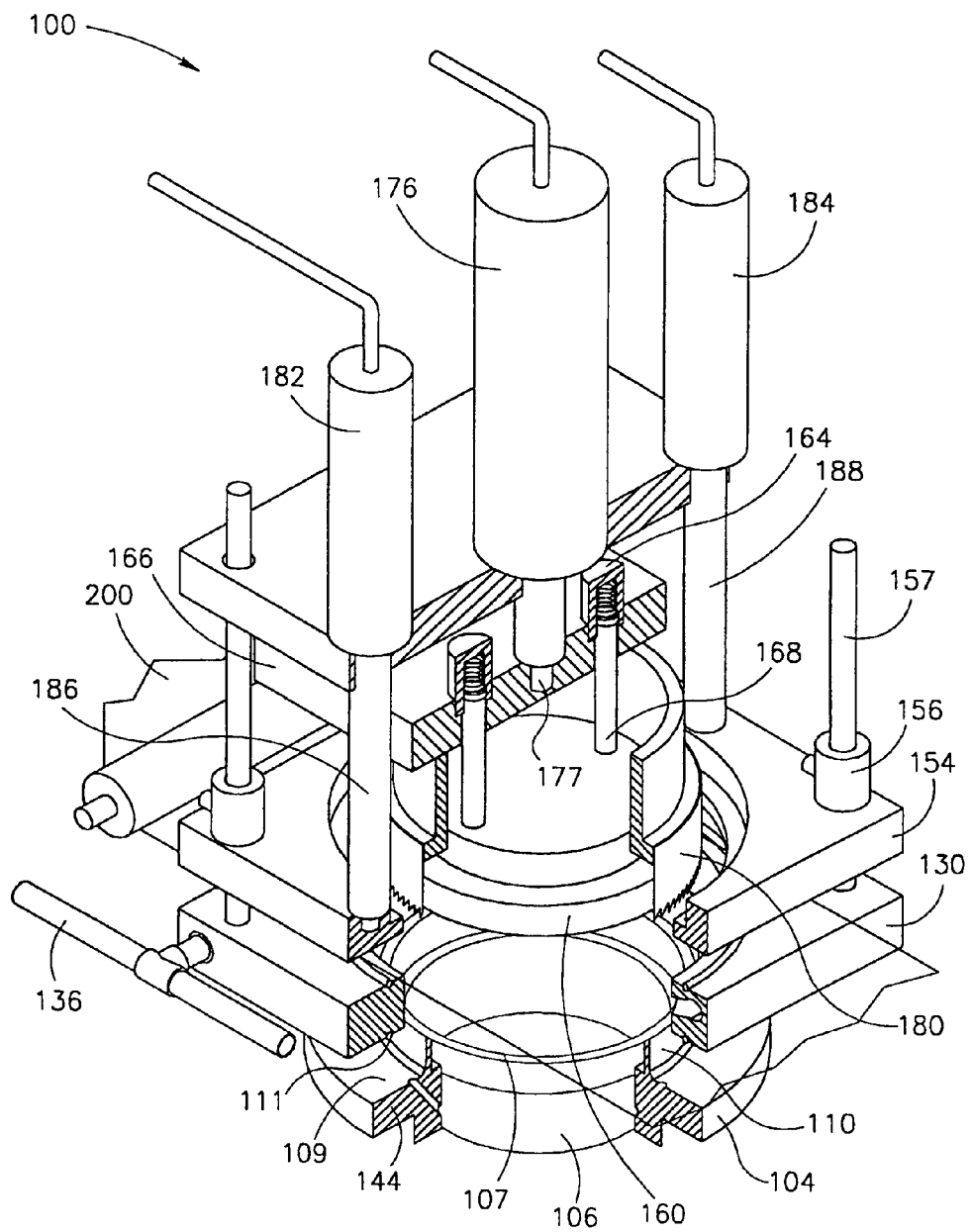
Figure 4A:
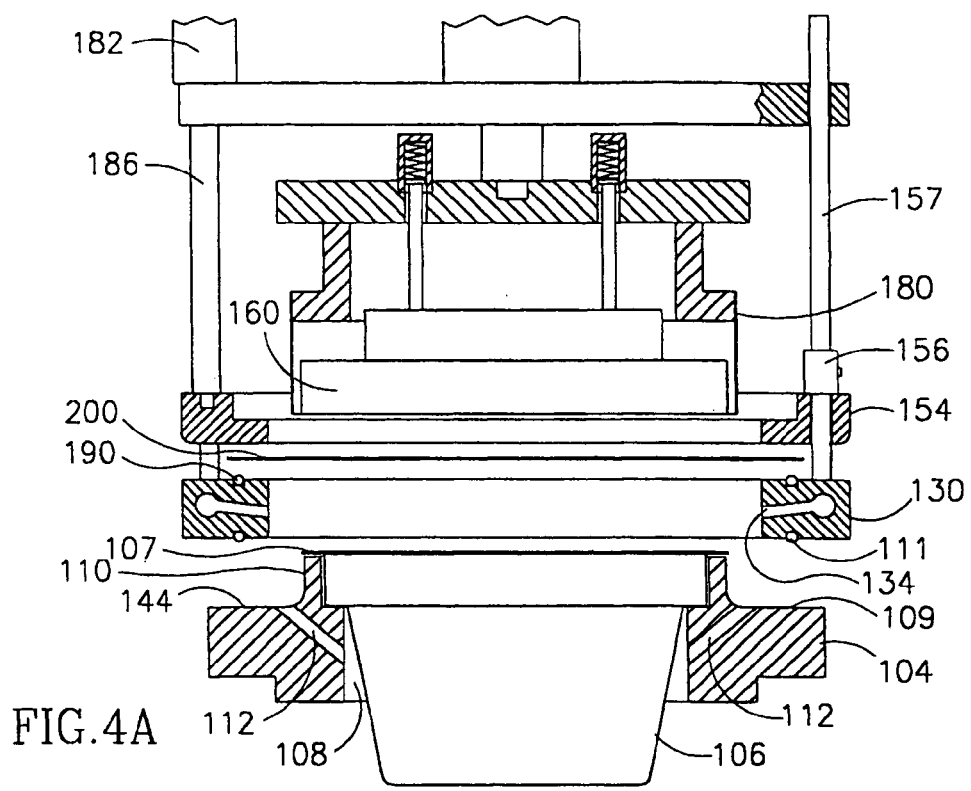

A first step of operation can be seen in FIGS. 3A and 4A. Container body 106, having in this specific embodiment inverted frustoconical shape, is received within holder 104 with the container's rim 107 resting over skirt 110. A film sheet 200 is tensioned between the spacer member 130 and film pressing plate 154 with sealing and trimming mechanism 150 being in a state such that heat welding plate 160 is distanced from the film. Film pressing plate 154 is displaced axially in its downward direction by means of the pneumatic or hydraulic pistons 182 and 184, extracting and retracting the respective piston rods 186 and 188 articulated at bores 190 and 192, respectively made in the film pressing plate 154.

Figure 3B:
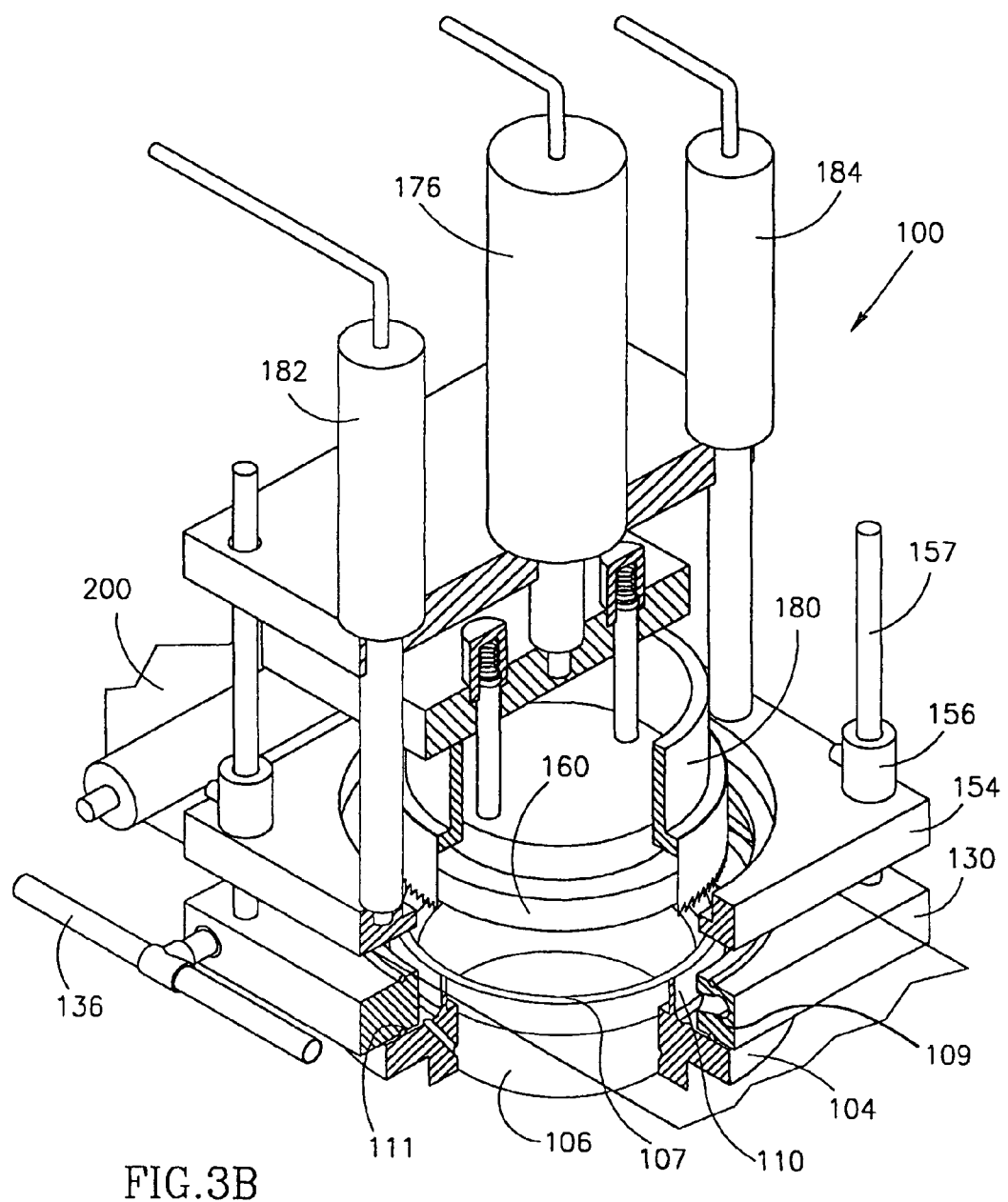
Figure 4B:
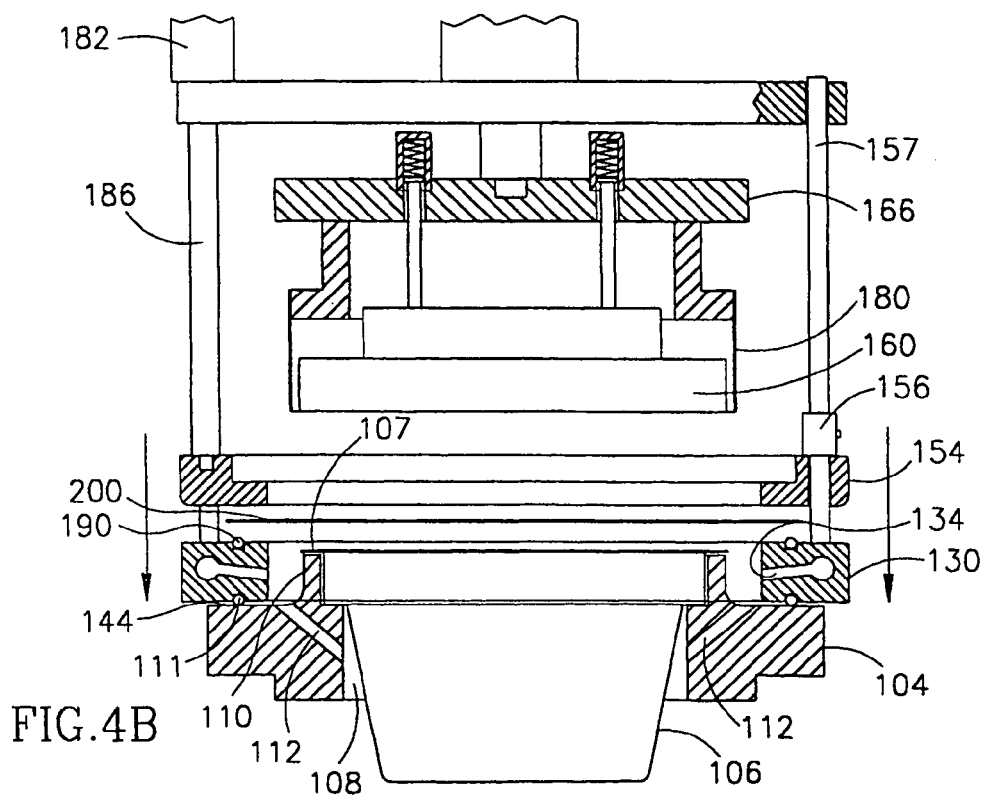

At a next stage seen in FIGS. 3B and 4B, the holder 104 and the remaining part of apparatus 100 are mutually displaced (either by elevating holder 104 or by lowering the reigning parts of the apparatus) so as to bring to engagement of spacer member 130 with peripheral portion 109 (FIG. 4A) of the holder, with an O-ring 111 fitted within a groove at a bottom face of spacer member 130, ensuring that the attachment will be in a gas-tight manner (not permitting gas passage through interface between these two bodies).

Figure 3C:
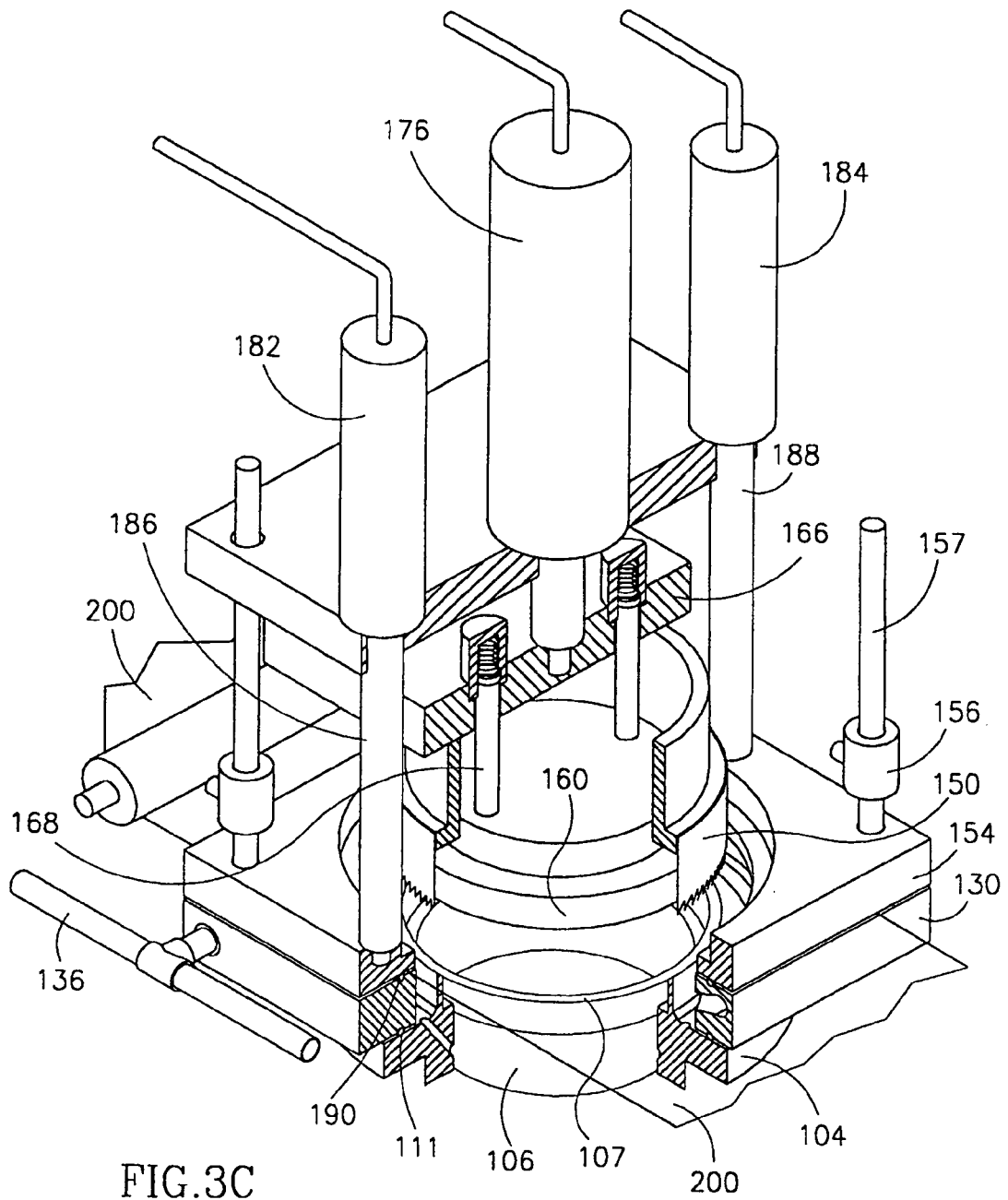
Figure 4C:
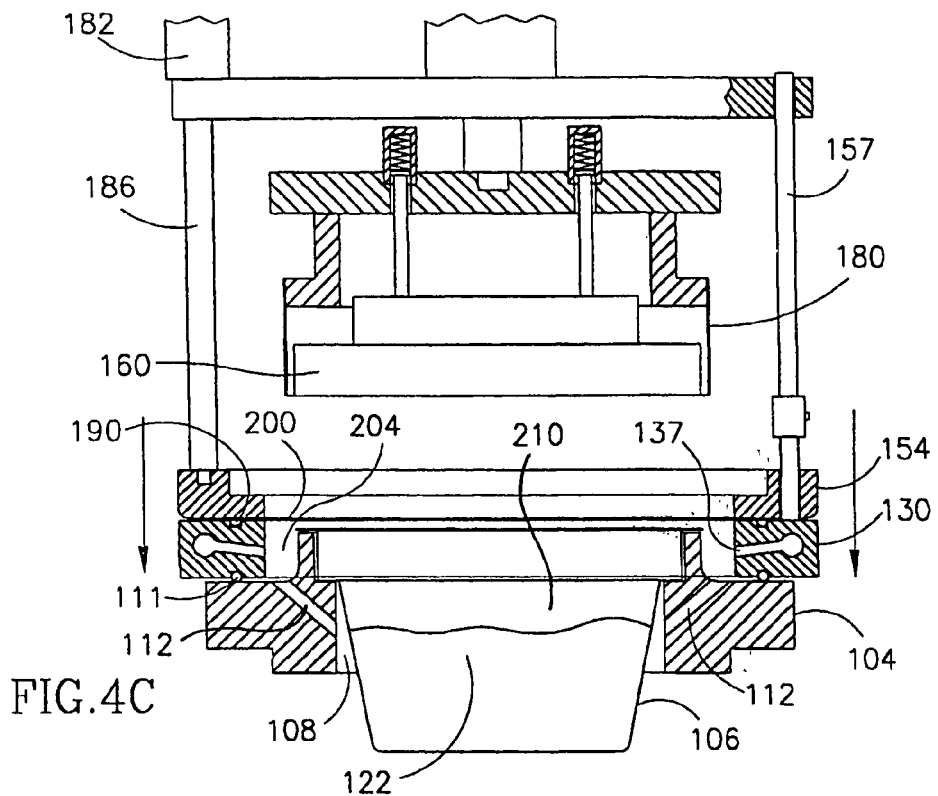

In a next step shown in FIGS. 3C and 4C, pressing plate 154 is lowered by means of piston rods 186 and 188, whereby the film is pressed between juxtaposed faces of film pressing plate 154 and upper face of spacer member 130. The O-ring 190 received within groove in the upper face of spacer member 130, ensures a gas-tight seal between film 200 and the spacer member. In this manner, a confined space 204 is defined between the container body 106, the film 200 and inwardly facing wall surface of holder 104 and spacer member 130.

Container body 106 contains a pasty food product, e.g. a dairy product 122 filled up to a certain level and leaving a residual space 210 between the upper face of the pasty food product 122 and the container's rim 107.

Figure 4D:
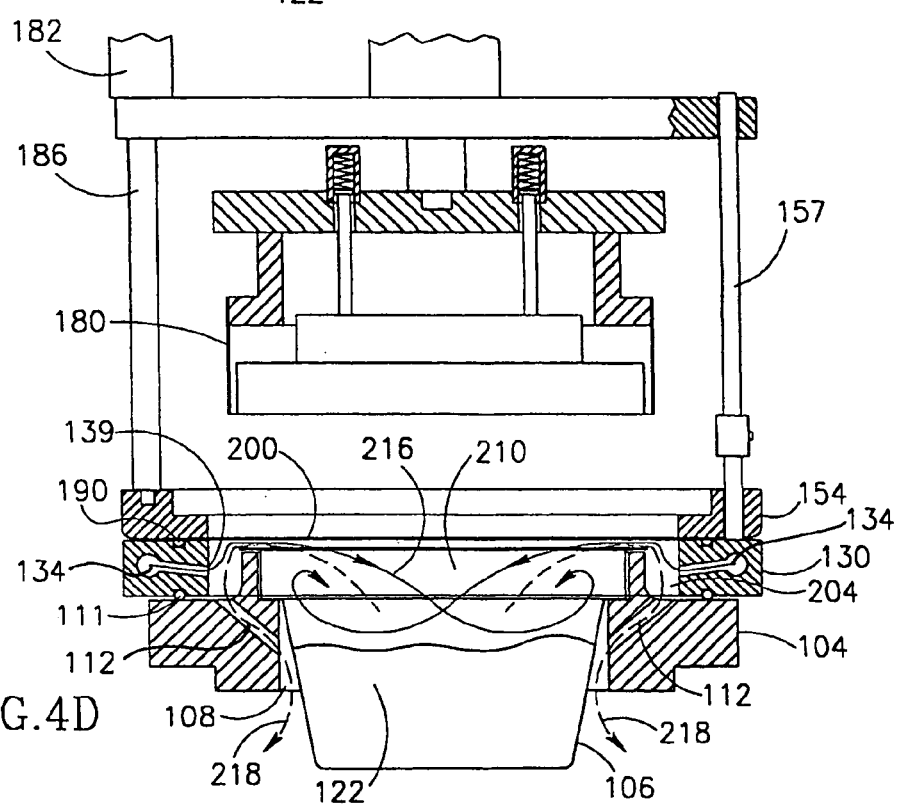

In the next step, seen in FIG. 4D, a replacement gas is introduced through nozzles 134 to generate a turbulent flow represented schematically by solid, curved arrowed lines 216, resulting in flushing of the residual space with the replacement gas. At the same time, gas is evacuated to the external atmosphere through bores 112, as represented schematically by dashed curved arrowed lines 218. In this specific embodiment the nozzles are at a level which is below that of the rim 107 of the container. This is in order to avoid direct blow of air jets on the food product which can cause the formation of an aerosol which is undesired. It should however be appreciated that this position of the nozzle is but an example and in other embodiments there may be other positions of the nozzles including such above the rim's level.

Figure 3D:
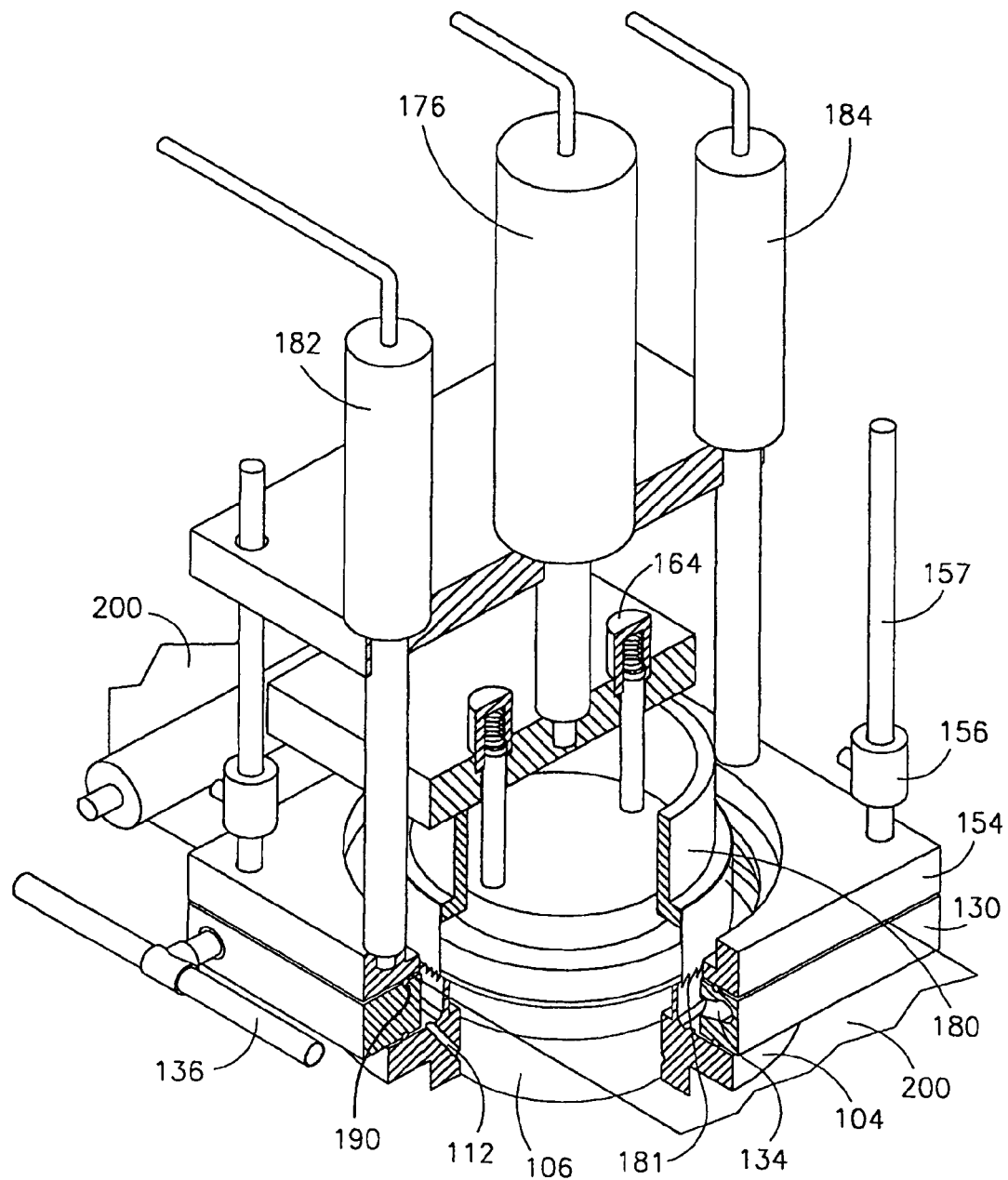
Figure 4E:
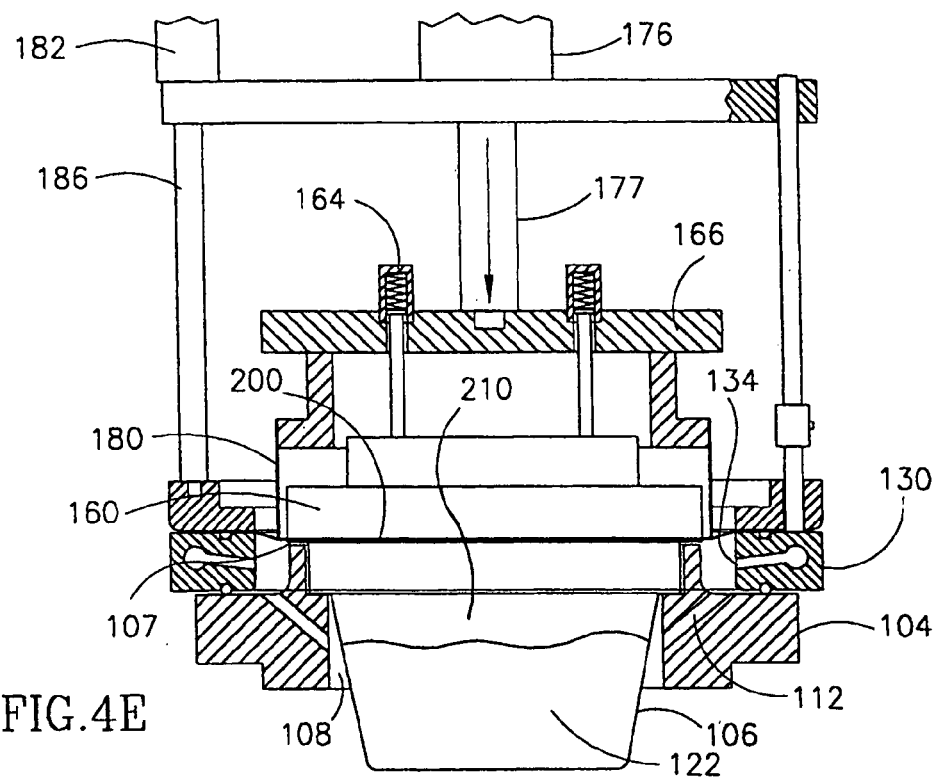

A subsequent step can be seen in FIGS. 3D and 4E in which a sub-assembly consisting; of plate 166, welding plate 160 and trimming member 180 is lowered towards the film 200, pushing the film 200 downwards to tightly engage rim 107 while the heat generated by plate 160 caused the film to weld to the rim. Welding plate 160 is downwardly biased by means of coiled-spring pistons 164 and thus the lower face, of the plate 160 is at a lower level than the cutting edge 181 of trimming member 180. This axial displacement of the sub-assembly is achieved by means of a piston rod 177 extending out of piston 176.

Figure 3E:
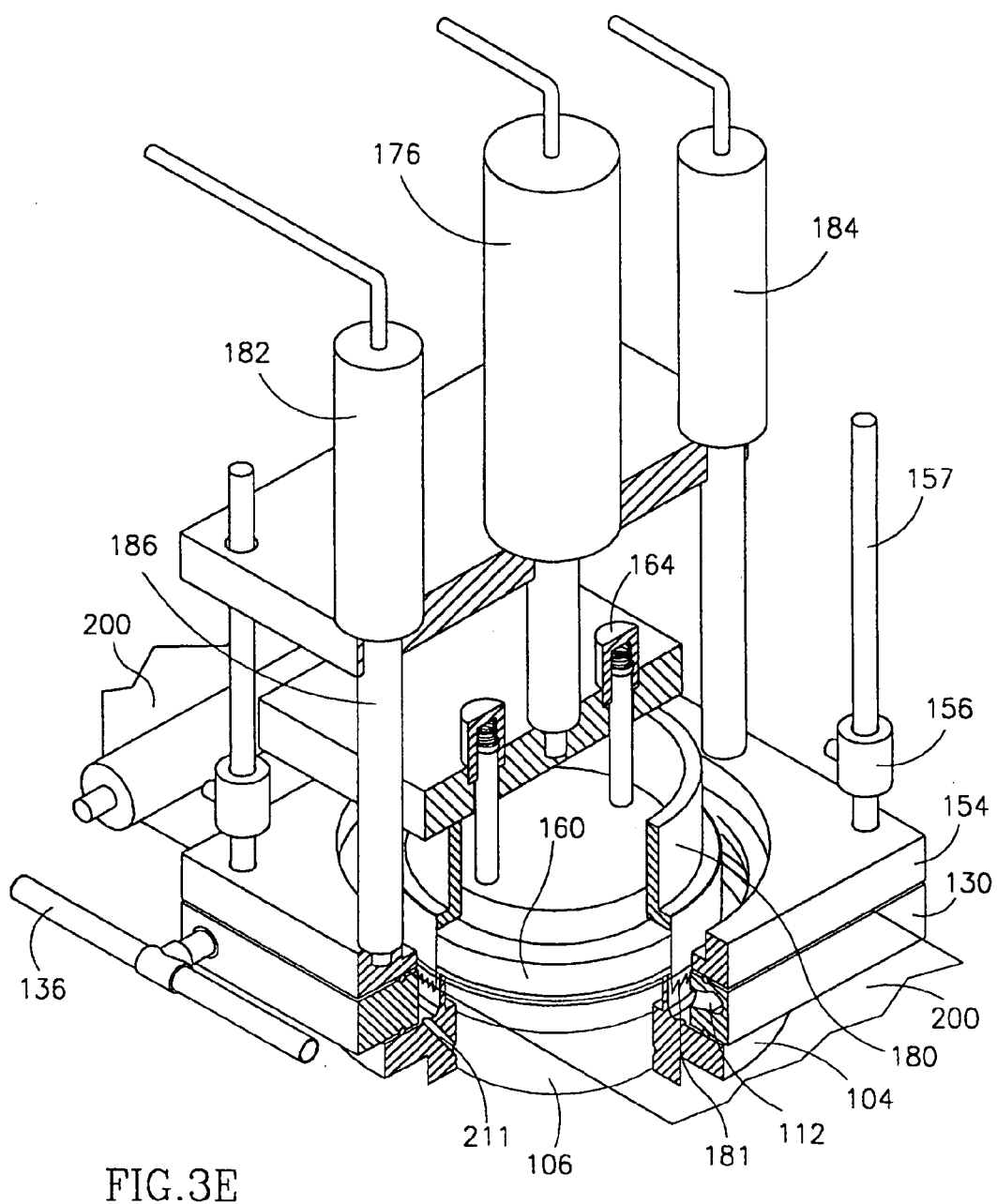
Figure 4F:
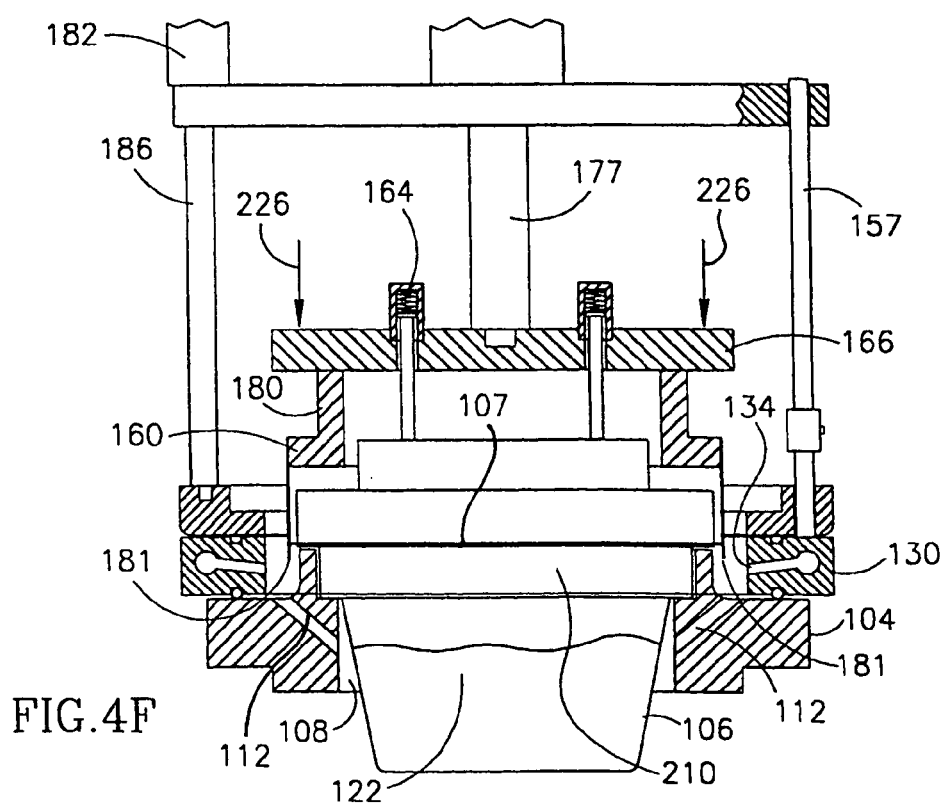

At a next step, seen in FIGS. 3E and 4F this sub-assembly continues its downward movement, represented by arrows 226 in FIG. 4F, causing compression of the spring within piston 164 and, thus bringing to an additional downward pressure for better sealing of film 200 onto rim 107. This downward displacement brings to lowering of a trimming edge 181 of trimming member 180 so as to trim film 200. Thereby, a container 122, where the residual space 210 is filled with the replacement gas, is formed.

Figure 5:
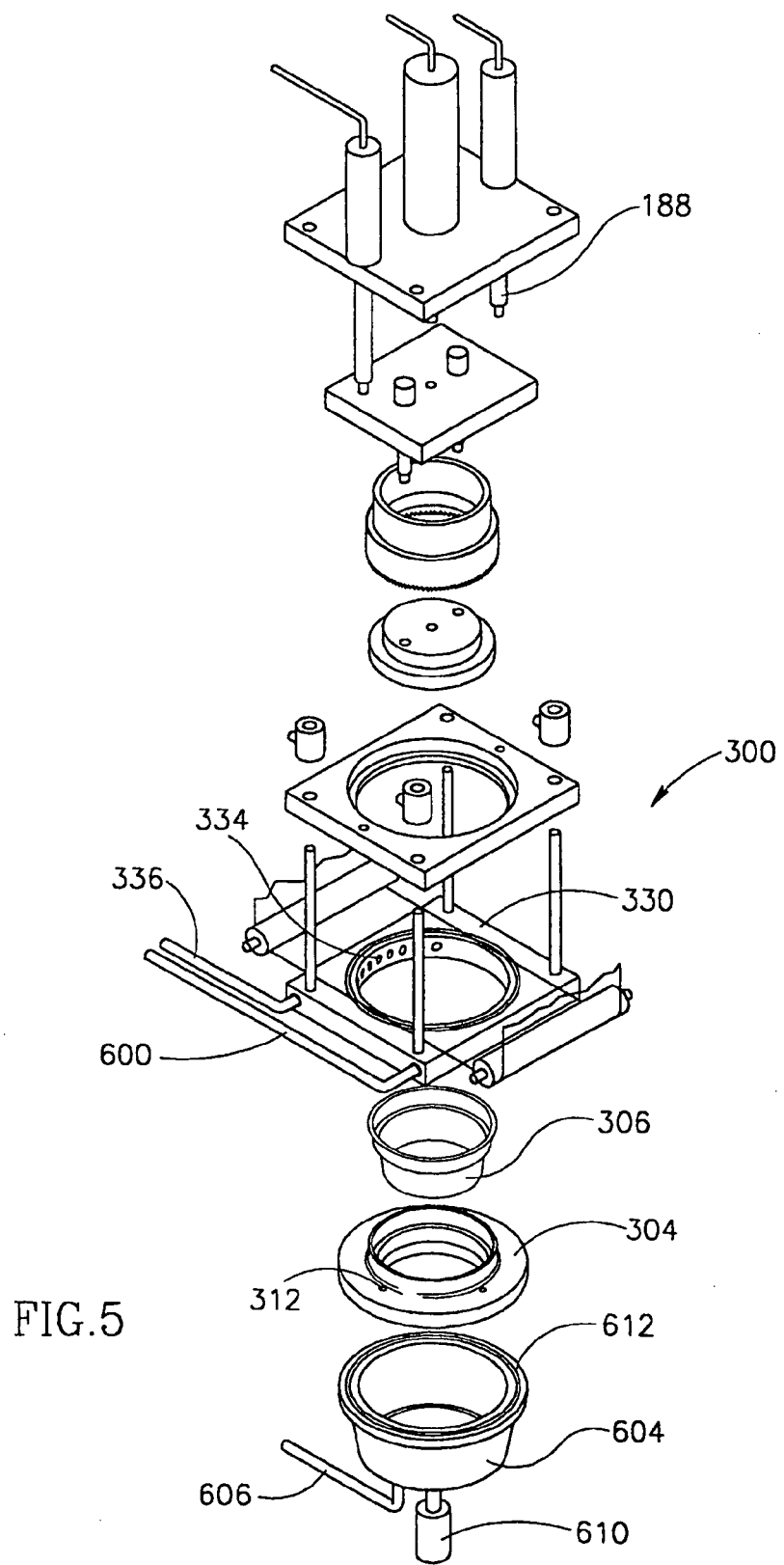
FIG. 5 is an exploded view of an apparatus in accordance with another embodiment of the invention.

Reference is now being made to FIG. 5 showing another embodiment in accordance with the invention. The apparatus 300 in accordance with this embodiment is identical at most of its components to the embodiment of FIG. 1 and only the differences will be outlined hereinbelow. Hereinbelow, when reference will be made to like components, they will be designated by the same reference numeral as used in the embodiment described above, shifted by 200.

Spacer member 330 is provided with a replacement gas inlet 336 and a gas outlet 600 leading to a vacuum source (not shown). Gas inlets and gas outlets are connected to corresponding nozzles 334 (only one set seen in this figure).

Another difference resides in the provision of a vacuum-forming cup 604 connected through tube 606 to the vacuum source. The vacuum-forming cup 604 is axially displaceable by means of piston 610 and is adapted for sealing engagement with a bottom surface of holder 304, by means of O-ring 612.

Bores 312 lead into the interior of vacuum-forming cup 604.

In operation, a vacuum forming cup is attached to the bottom of holder 304 and the vacuum source is connected leading to the formation of a vacuum within the confined space. In addition, the vacuum within the interior of vacuum-forming cup 604 ensures that the container body 306 does not collapse from the vacuum applied at its interior.

Apart from the above noted differences, the operation of an apparatus in accordance with this embodiment is essentially the same as the apparatus in accordance with the embodiment described above.

What is claimed is:

1. A method for packaging a product in a hermetically sealed container having a cup-shaped rigid or semi-rigid body provided with a rim fitted with solely a single closure, the method comprising:
    a) introducing the product into said cup-like shaped body;
    b) placing the container into a holder beneath and concentrically with a central opening of a spacer member;
    c) providing above the rim solely a single flat, flexible closure-forming, gas-impermeable membrane, said membrane extending between the spacer member and a pressing plate;
    d) relative vertically displacing the holder and the spacer member without displacing the membrane so as to form proximate to the rim a confined space, said space having at least one gas inlet and at least one gas outlet, said space being defined by an upper part of the container body, by the closure-forming membrane, by an inwardly facing surface of the central opening and by a peripheral portion of the holder, said confined space being formed adjacent to the rim and at a distance therefrom;
    e) introducing an inert replacement gas through said inlet into said confined space in order to expel from the container body at least a substantial portion of gas originally contained in the container body and replace it with the inert replacement gas;
    f) displacing said container body to bring the closure-forming membrane in contact with said rim; and
    g) hermetically attaching the membrane to the rim to form a gas-tight seal therebetween.

2. A method according to claim 1, wherein said product is a pasty material.

3. A method according to claim 1 or 2, wherein said product is a food product.

4. A method according to claim 1, wherein the closure-forming membrane is a plastic film.

5. A method according to claim 1, wherein said confined space is brought in communication with the external atmosphere via the said gas outlet.

6. A method according to claim 1, wherein said confined space is brought in communication with a vacuum forming means via the said gas outlet.

7. The method according to claim 1 wherein the inert gas is nitrogen or carbon dioxide.

8. The method according to claim 1 wherein the gas-impermeable membrane is gas impermeable in its entirety and is directly adjacent the product there being no physical element between the product and the gas impermeable membrane.

* * * * *